United States Patent [19]

Wu

[11] Patent Number: 6,129,430
[45] Date of Patent: Oct. 10, 2000

[54] STYLUS REMOVAL MECHANISM

[75] Inventor: Yaz-Tzung Wu, Taipei, Taiwan

[73] Assignee: Inventec Corp., Taiwan

[21] Appl. No.: 09/324,739

[22] Filed: Jun. 3, 1999

[51] Int. Cl.⁷ .................................................. A47B 97/00
[52] U.S. Cl. ..................................... 312/223.2; 178/19.01
[58] Field of Search ........................... 312/223.1, 223.2, 312/215, 222, 319.1; 178/18.03, 19.01; 361/683; 70/58, 162

[56] References Cited

U.S. PATENT DOCUMENTS

| | | | |
|---|---|---|---|
| 4,927,986 | 5/1990 | Daly | 178/19.01 |
| 5,049,862 | 9/1991 | Dao et al. | 178/18.03 X |
| 5,077,991 | 1/1992 | Stickel et al. | 70/58 |
| 5,180,891 | 1/1993 | Trumbo | 178/19.01 |
| 5,319,519 | 6/1994 | Sheppard et al. | 312/319.1 X |
| 5,555,157 | 9/1996 | Moller et al. | 312/223.2 X |
| 5,574,625 | 11/1996 | Ohgami et al. | 312/223.2 X |
| 5,649,750 | 7/1997 | Ishii et al. | 312/223.2 |
| 5,703,626 | 12/1997 | Itoh et al. | 178/19.01 X |
| 5,823,644 | 10/1998 | Suh et al. | 312/223.2 |
| 5,870,283 | 2/1999 | Maeda et al. | 70/58 X |

FOREIGN PATENT DOCUMENTS

91/17493  11/1991  WIPO .

*Primary Examiner*—Peter M. Cuomo
*Assistant Examiner*—James O. Hansen
*Attorney, Agent, or Firm*—Raymond Sun

[57] ABSTRACT

A portable computing device has a first housing, and a second housing hingedly coupled to the first housing. The second housing having an interior that stores a stylus, and which houses a stylus removal mechanism in a manner such that manipulation of the stylus removal mechanism simultaneously releases the first housing from the second housing and removes the stylus from the second housing.

16 Claims, 7 Drawing Sheets

STYLUS REMOVAL MECHANISM

BACKGROUND OF THE INVENTION

1. Field of the Invention

The present invention relates generally to a stylus removal mechanism for use in removing a stylus from portable computing devices.

2. Background Art

Portable computing devices, such as palm-top computers, hand-held computers, laptop computers and personal digital assistants (PDAs), have become increasingly popular. Many of these portable computing devices include an electronic stylus or pen that can be utilized by a user to input information into the computer or to select menu options or otherwise navigate through the graphical user interfaces of an operating system or the current software application.

Currently, the stylus is either clipped to the outer housing of the portable computing device, or stored inside the housing of the portable computing device. Clipping the stylus to the outside of the housing provides convenient access to the stylus, but also carries the disadvantage that the stylus can be easily dislodged from the clip by inadvertent contact with objects, such as the inner surfaces of a carrying case or other objects in the carrying case. Storing the stylus inside the housing provides more security to the stylus, but suffers from the disadvantage that the user must take additional steps in order to release the stylus from its place of storage. For example, in one case, a user may be required to reach into the housing to grasp the stylus. In another example, a user may be required to push the pen further into the housing in order to activate a "door lock release" that will push the stylus out of the housing when the user pushes the pen further into the housing.

Accordingly, there remains a need for a simple and convenient mechanism and method for providing a stylus to a user in a manner that avoids and overcomes the disadvantages set forth previously.

SUMMARY OF THE INVENTION

It is an object of the present invention to provide a stylus removal mechanism that does not require the user to manipulate, touch or otherwise grasp the stylus in order to remove the stylus from its storage location.

It is a further object of the present invention to provide a stylus removal mechanism that simultaneously removes the stylus from its storage location and releases the top cover of a portable computing device.

In order to accomplish the objects of the present invention, a portable computing device is provided having a first housing, and a second housing hingedly coupled to the first housing. The second housing having an interior that stores a stylus, and which houses a stylus removal mechanism in a manner such that manipulation of the stylus removal mechanism simultaneously releases the first housing from the second housing and removes the stylus from the second housing.

In one embodiment of the present invention, the stylus removal mechanism has a block which has a chamber for receiving a portion of a stylus, a first biasing element coupled to the block to bias the block in a first direction, a latch assembly that includes a plate having a hooked leg, and a second biasing element coupled to the plate to bias the plate in a second direction different from the first direction. The hooked leg engages the block against the bias of the first biasing element. When the plate is moved in a third direction opposite to the second direction, the hooked leg disengages the block so that the second biasing element biases the block in the first direction.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional mechanical parts and structures are omitted so as to not obscure the description of the present invention with unnecessary detail.

The present invention provides a stylus removal mechanism that is capable of (1) removing a stylus from a stylus housing without a user having to grasp, touch or otherwise manipulate the stylus, and (2) simultaneously removing a stylus from a stylus housing and releasing a display housing from a keyboard housing. For purposes of the descriptions set forth herein, the term "portable computing device" is intended to mean any electronic device that utilizes a pen or stylus as an input or indicating device. Non-limiting examples can include palm-top computers, hand-held computers, laptop computers, PDAs, electronic calculators, electronic planners, among others, and do not need to include separate keyboard and display housings that are hinged or pivoted together.

Figure 1:
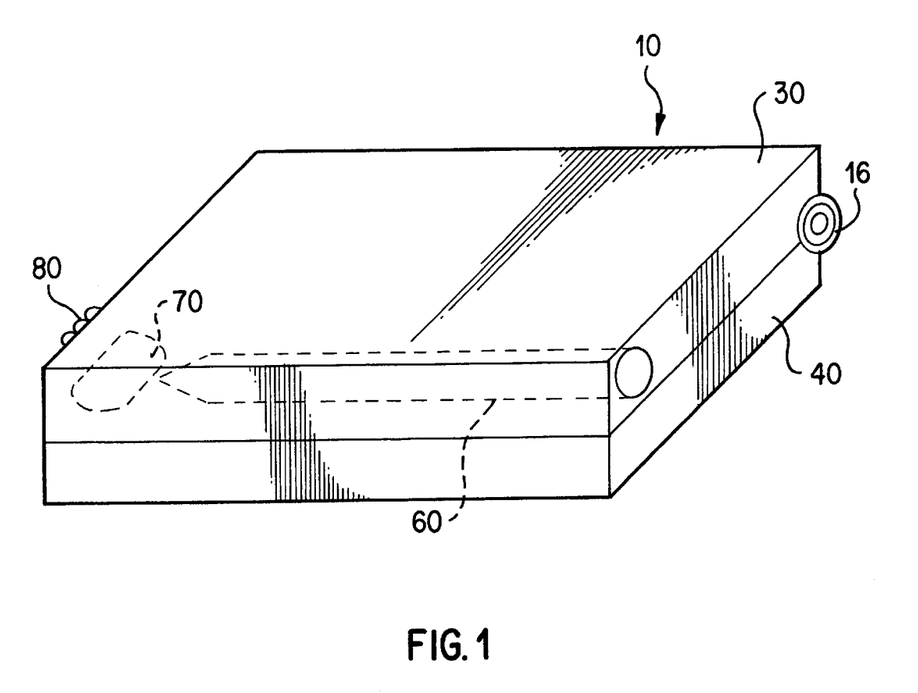
FIG. 1 illustrates a perspective view of a palm-top computer in which the stylus removal mechanism of the present invention can be implemented.

FIG. 1 illustrates a perspective view of a portable computing device 10 in which the stylus removal mechanism 70 of the present invention can be implemented. The portable computing device 10 in FIG. 1 is illustrated in the form of a palm-top computer, although the principles of the present invention are also applicable to other portable computing devices. Palm-top computer 10 includes a display housing 30 for housing the display 31 (see FIG. 2), a stylus 60, and display electronics (not shown). The palm-top 10 also includes a keyboard housing 40 for housing the keyboard and the computer electronics (not shown). The display housing 30 is hingedly coupled to the keyboard housing 40 by a hinge 16. FIG. 1 illustrates the palm-top 10 in a closed or storage position. When the display housing 30 is opened to reveal the display, the palm-top 10 is in an open or release position. A user-manipulable switch or knob 80 is provided to operate the stylus removal mechanism 70 of the present invention to remove the stylus 60 and, as explained hereinafter with reference to one embodiment, can also be utilized by a user to simultaneously open the display housing 30 from the keyboard housing 40.

Figure 2:
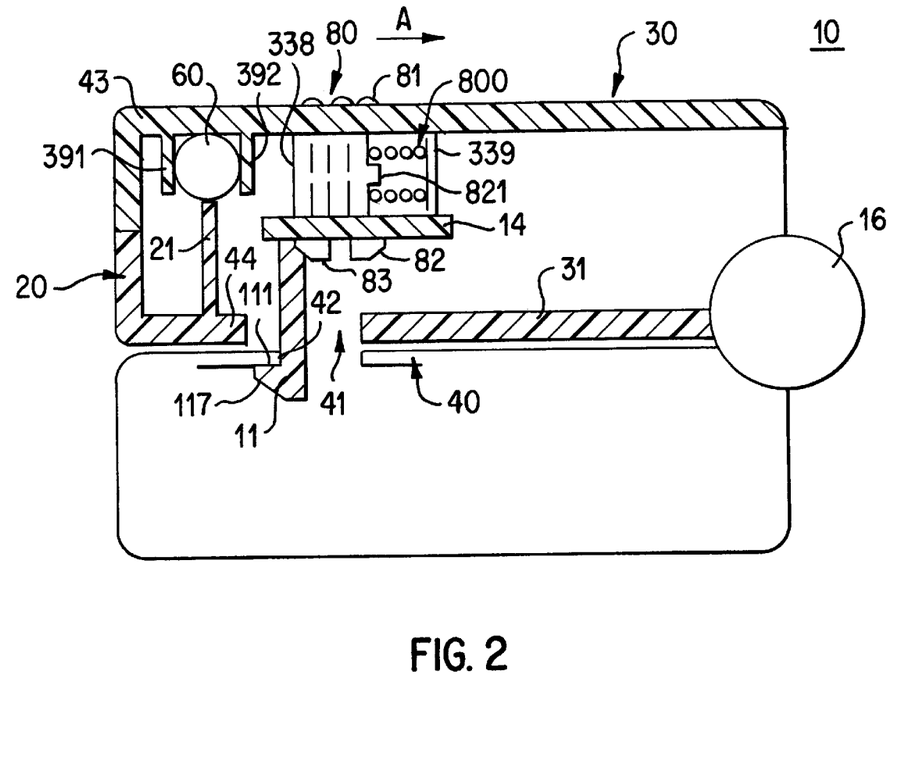
FIG. 2 illustrates a cross-sectional side view illustrating one embodiment of the stylus removal mechanism of the present invention.

FIG. 2 is a cross-sectional side view illustrating one embodiment of the stylus removal mechanism 70 of the present invention and how the mechanism 70 is used to open the display housing 30. Keyboard housing 40 defines a hook arm receiving opening 41 through which a hook arm 11 can pass. As explained in greater detail below, the hook arm 11 is coupled to and carried by the display housing 30. In FIG. 2, the hook arm 11 is in a closed or storage position with an undersurface 111 of hook arm 11 engaging the undersurface of a shoulder 42 of the keyboard housing 40 so that the display housing 30 is locked or secured to the keyboard housing 40. As will be described in greater detail hereinafter, when the knob 80 is biased in the direction indicated by the arrow A, the latch 79 (see FIG. 3) of the present invention causes the hook arm 11 to be displaced in the same direction as that of arrow A and to pass into the opening 41, thereby causing surface 111 to become disengaged from shoulder 42 of the keyboard housing 40 so that the display housing 30 can be "unlocked" or released from the keyboard housing 40.

Figure 3:
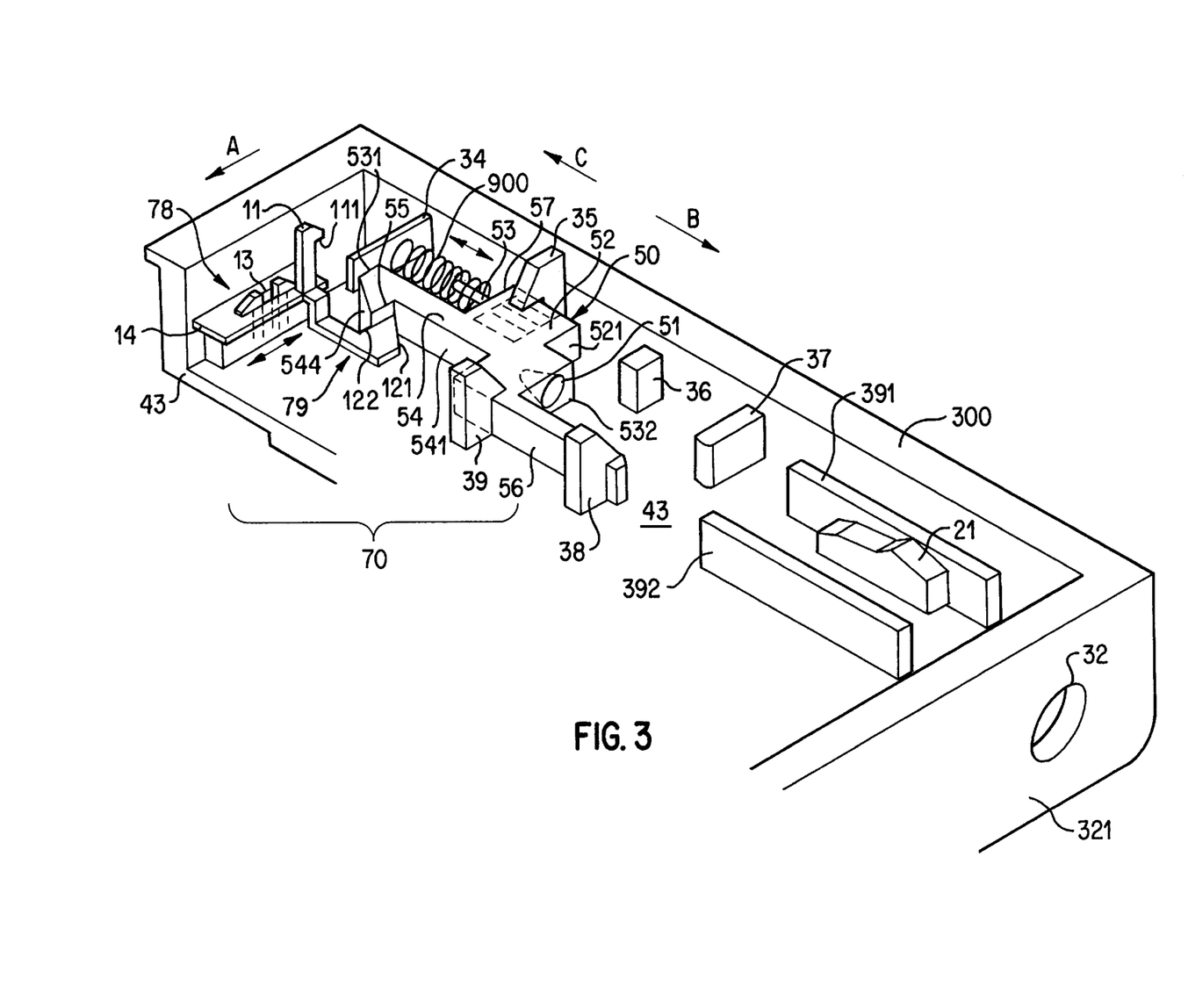
FIG. 3 is a perspective view of the stylus removal mechanism of FIG. 2 disposed in an open display housing.
Figure 4:
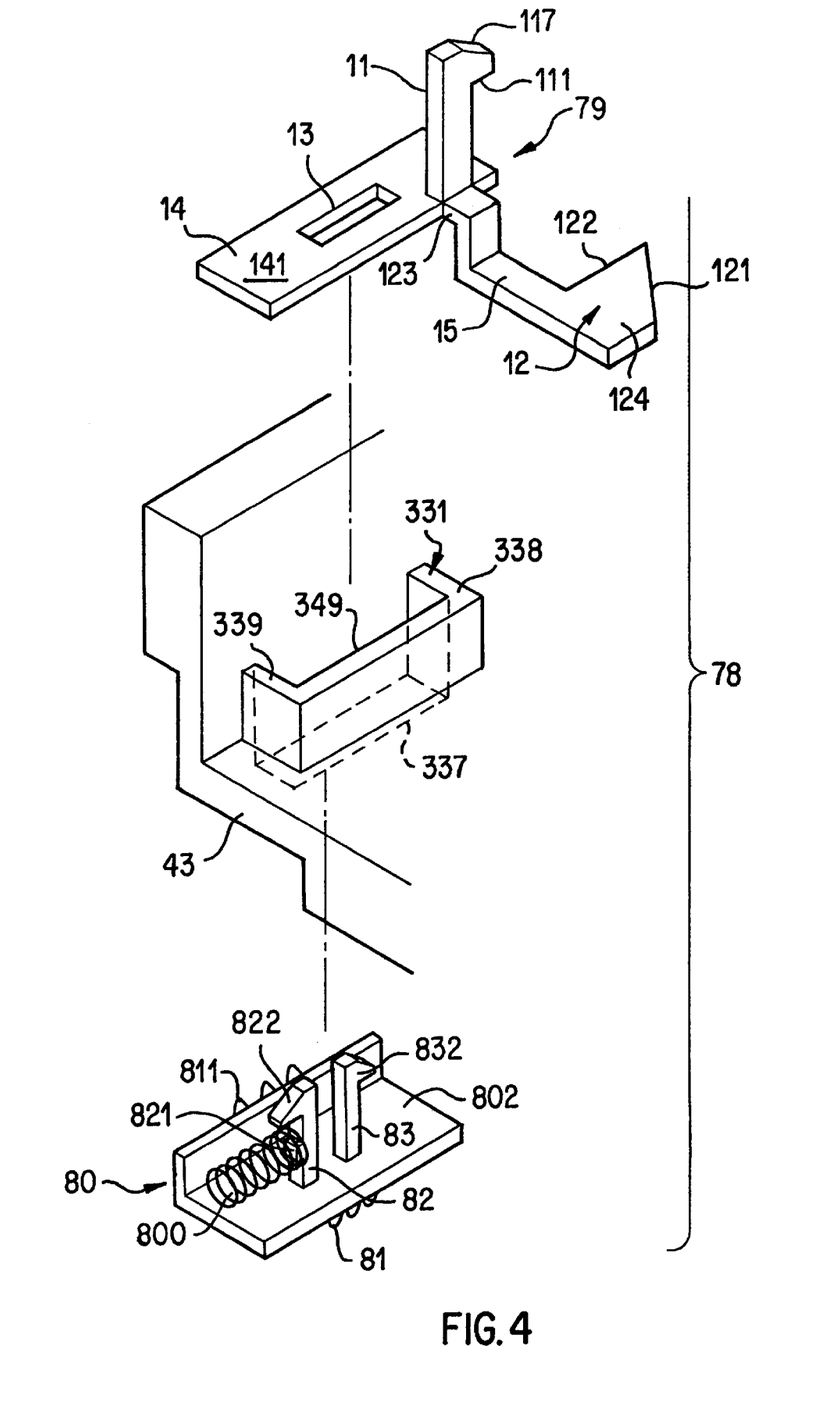
FIG. 4 is an exploded perspective view illustrating in greater detail the switch assembly of FIG. 3.

FIG. 3 is a perspective view of an opened display housing 30 (i.e., the display housing 30 with the display panel 31 being removed) illustrating the stylus removal mechanism 70 of FIG. 2. Stylus removal mechanism 70 includes a latch assembly 78 that cooperates with a stylus-retaining block 50 and its associated guide system to eject or remove a stylus 60 from inside the display housing 30. FIG. 4 is an exploded perspective view illustrating in greater detail the latch assembly 78 of FIG. 3. The latch assembly 78 includes a latch 79, a body portion 331, and a switch or knob 80.

The latch 79 includes a generally rectangular plate 14 having an elongated opening 13, a hook arm 11 that extends vertically in a perpendicular manner from plate 14, and a leg 12 that extends horizontally from an edge of the plate 14, but perpendicular to the hook arm 11. The hook arm 11 has an undersurface 111 at its hooked end that is adapted to engage the shoulder 42 of the keyboard housing 40. The leg 12 includes a main body 15 that is offset from the plate 14 at a different vertical level by a stepped first end 123, and a second end 124 that provides an L-shaped extension. The L-shaped extension has an angled first surface 121 and an adjacent second surface 122 that is disposed perpendicular to the main body 15. As explained in greater detail below, the second surface 122 is adapted to engage a surface 55 of the block 50 to maintain the block 50 in the storage position.

The body portion 331 has a generally U-shaped configuration that includes two end walls 338, 339 and a connecting wall 349 that are mounted to the display housing 30. One of the end walls 339 is utilized as a support for one end of a spring 800, with the other end of the spring 800 received by a shaft 821 protruding from a first arm 82 of the knob 80 and biased against the first arm 82. The other end wall 338 defines a stop for a second arm of the knob 80.

The knob 80 has an L-shaped body 802 that has an outer surface that includes a plurality of ridges 811 (see also FIG. 5) that help the user to grip the knob 80. The knob 80 includes a first arm 82 and a second arm 83 that extend from the body 802. Each arm 82 and 83 has a hook 822 and 832, respectively. The body 802 lies outside the display housing 30, and the display housing 30 has an elongated opening 337 aligned with the interior space defined by the body portion 331 through which the arms 82, 83 extend. Thus, the arms 82, 83 extend through the opening 337, the interior of body portion 331, and the opening 13 of plate 14 to engage the top surface 141 of the plate 14. In this regard, the hooks 822, 832 essentially secure and position the plate 14 over the body portion 331.

Since the body portion 331 is mounted to display housing 30 and is not movable with respect thereto, the knob 80 is maintained in the closed or storage position (as shown in FIG. 2) with the second arm 83 normally biased against the end wall 338. This bias is exerted by the spring 800 against the first arm 822 and the body 802 in the direction opposite to the direction of arrow A. When in this storage position, the hook arm 11 engages the shoulder 42 to lock the display housing 30 to the keyboard housing 40, and the surface 122 of the second end 124 engages the surface 55 of the block 50. To unlock or release the display housing 30 and the stylus 60, the user slides the knob 80 in the direction of arrow A against the bias of the spring 800, causing latch 79 and its hook arm 11 and main body 15 (i.e., which includes the second end 124) to be advanced in the direction of arrow A to be disengaged from the shoulder 42 and block 50, respectively, to reach the open or release position. Thus, the latch 79 can be slidably moved with respect to the body portion 331 between the locked position and the release position.

Referring now to FIG. 3, the stylus removal mechanism 70 also includes a stylus retaining block 50. The block 50 includes a main body 52, an L-shaped hook member 54 that extends to a first or rear end 531 of the main body 52, and a leg 56 extending from an inner side 541 of the main body 52 away from a second or front end 532 that is opposite to the first end 531. An angled surface 544 is provided adjacent the first end 531 for sliding engagement with the angled surface 121 of the leg 12. The leg 56 extends in parallel manner to the main body 52, but further in the longitudinal direction away from the second end 532. The main body 52 also includes a stylus tip receiving chamber 51 at the second end 532 adjacent the location where the leg 56 branches off from inner side 541. In this embodiment, the chamber 51 can have a tapered conical configuration.

The block 50 further includes a shaft 53 that extends parallel to the side 541 of the main body 52 towards the first end 531 from a surface 57 of main body 52. The shaft 53 receives a bias or resilient element 900, such as a spring, that normally biases the block 50 away from a support plate 34. The support plate 34 contacts or engages one end of spring 900 while the surface 57 of block 50 contacts or engages the opposing end of the spring 900. Support plate 34 also abuts the first end 531 of the block 50 to limit the rearward movement and position of the block 50.

Thus, when in the closed or storage position, the spring 800 exerts a normal and simultaneous bias on the hook arm 11 and the leg 12 in a direction opposite to the direction of arrow A. When in this closed or storage position, the hook arm 11 engages the shoulder 42 of the keyboard housing 40, and the L-shaped extension of the second end 124 of the leg 12 engages the surface 55 of the block 50, as explained above. This engagement of the leg 12 and the block 50 maintains or secures the block 50 in the closed or storage position, since the block 50 is normally resiliently biased in a forward direction of arrow B by spring 900, but cannot move in this direction of arrow B because the surface 55 of the hook member 54 of the block 50 abuts against the surface 122 of the leg 12, which operates to prevent movement by the block 50 in the direction of arrow B.

The display housing 30 includes a front wall 300, a top cover wall 43, a side wall 321, and an inner or bottom wall 44 (see FIG. 2, which is the same wall on which the display 31 is provided) that are all attached together to form the display housing 30. Certain support elements are provided on the front wall 300 and the top cover wall 43 to hold the block 50 in place inside display housing 30, and to provide a track for reciprocal movement by the block 50. Specifically, a first hooked guide 35 extends perpendicularly from top cover wall 43 to guide one side of the main body 52 along a reciprocating path of travel rearward (see direction of arrow C) and forward (see direction of arrow B) while limiting the vertical displacement of the block 50. A second hooked guide 38 and a third hooked guide 39 also extend perpendicularly from the top cover wall 43 along the same longitudinal line, and together function to guide the leg 56 along a path of travel rearward (arrow C) and forward (arrow B) while limiting the vertical displacement of block 50. In addition, the support plate 34 extends perpendicularly from the front wall 300, and a stopper 36 extends perpendicularly from the front wall 300. The support plate 34 functions to limit the movement of block 50 in the rearward direction of arrow C and the stopper 36 functions to limit the movement of block 50 in the forward direction of arrow B. Specifically, stopper 36 contacts or abuts a recessed front surface 521 of the block 50 to prevent further movement of the block 50 beyond the position of stopper 36.

The front wall 300, top cover wall 43, side wall 321 and bottom wall 44 also provide support elements that combine to hold or retain a stylus 60 inside the display housing 30. For example, the display housing 30 has a first guide wall 391 and a second guide wall 392 that extend perpendicularly from the top cover wall 43. First guide wall 391 and second guide wall 392 are parallel to each other, and provide lateral (i.e., sideways) support for stylus 60. In addition, as shown in FIGS. 2 and 3, an upper guide wall 21 extends perpendicularly from the bottom wall 44 to provide vertical support to stylus 60. A stylus holding arm 37 also extends in a generally perpendicular manner from the front wall 300 and extends into a corresponding recess 61 in stylus 60 (see FIG. 5) in order to hold stylus 60 in the storage position and to prevent stylus 60 from accidentally falling out of display housing 30 through the stylus opening 32 provided in the side wall 321 of the display housing 30.

Figure 5:
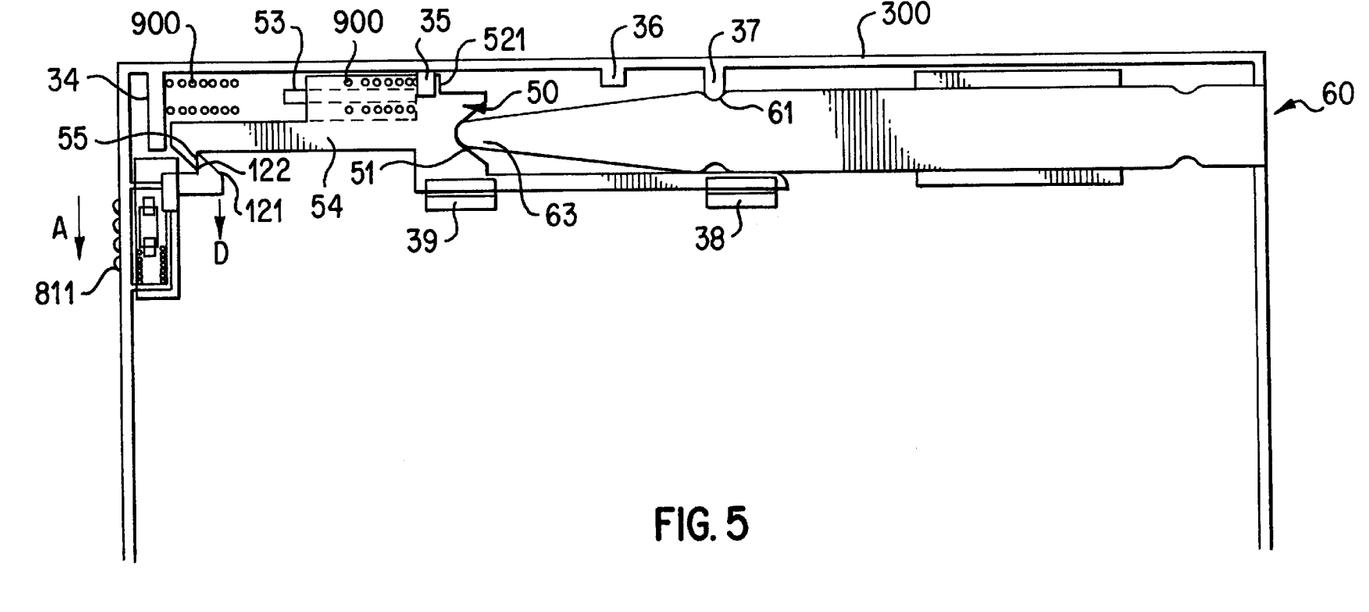
FIG. 5 is a bottom view of the stylus removal mechanism of FIG. 3 showing a stylus stored in the stylus housing.

The operation of the stylus removal mechanism of the present invention will be described with reference to FIGS. 2, 3 and 5. From the closed or storage position, when the knob 80 is moved in the direction of arrow A, the first arm 82 pulls the plate 14 in the same direction, causing both the hook arm 11 and the leg 12 to move simultaneously in the same direction (see also arrow D in FIG. 5). This results in two simultaneous release events. First, the hook arm 11 dis-engages from the shoulder 42 of the keyboard housing 40 to release the display housing 30 from the keyboard housing 40 in the manner described above. Second, the leg 12 dis-engages the surface 55 of the block 50, so that the bias of the spring 900 will push the block 50 from the storage position into the release position, where the surface 521 of the block 50 abuts against stopper 36. As the block 50 moves from the storage position to the release position, the force of the moving block So will push or eject the stylus 60 past the hold of arm 37 and through the stylus opening 32 in side wall 321. The movement of the block 50 is guided by the track defined by the hooked guides 35, 38, 39 so that the block 50 cannot be shifted sideways, and can only be reciprocated longitudinally. Rearward and forward movement of the block 50 is limited by the support plate 34 and the stopper 36, respectively. Thus, the display housing 30 and the stylus 60 are simultaneously opened and released, respectively. After the display housing 30 has been opened, the spring 800 biases the hook arm 11 back to the storage position.

When the user desires to close or lock the display housing 30 to the keyboard housing 40, the user merely presses the display housing 30 vertically downward on to the keyboard housing 40. This causes the angled surface 117 on hook arm 11 to slide downwardly at an angle along the top of shoulder 42 (see FIG. 2). This sliding will in turn press the hook arm 11, plate 14 and arm 83 in the direction of arrow A against the bias of spring 800, until the hook arm 11 is positioned inside the hook arm receiving opening 41. At this time, the spring 800 will bias the hook arm 11 in the direction opposite to that of arrow A, to cause the undersurface 111 of hook arm 11 to engage the underside of the shoulder 42 to assume the closed or storage position.

The block 50 stays in the release position until a stylus 60 is reinserted. This is true even after the display housing 30 has been locked into place against the keyboard housing 40 into the closed or storage position. Thus, the block 50 will only return to its storage position if a stylus 60 is reinserted through stylus opening 32 and the tip of the stylus 60 enters the chamber 51 and pushes the block 50 rearwardly in the direction of arrow C. When block 50 is pushed rearwardly, the angled surfaces 121 and 544 engage each other, and push and slide with respect to each other, which will in turn press the leg 12, plate 14 and arm 83 in the direction of arrow A against the bias of spring 800, until the angled surfaces 121 and 544 fail to engage each other. At this time, the spring 800 will bias the hook arm 11 in the direction opposite to that of arrow A, to cause the surface 122 of leg 12 and the surface 55 of block 50 to re-engage each other, thereby holding and securing the block 50 in the storage position shown in FIG. 3.

The stylus removal mechanism 70 shown in FIGS. 2–5 provide for the simultaneous release of the display housing 30 and the stylus 60. However, there may be circumstances and constructions where it may be desirable for the release of the display housing 30 and the stylus 60 to be controlled separately. For example, the portable computing device 10 may not have a hinged or pivoting display housing (such as an electronic calculator), or the designer of the portable computing device 10 may simply decide that it is more desirable to facilitate the separate release of the display housing 30 and the stylus 60.

Figure 6:
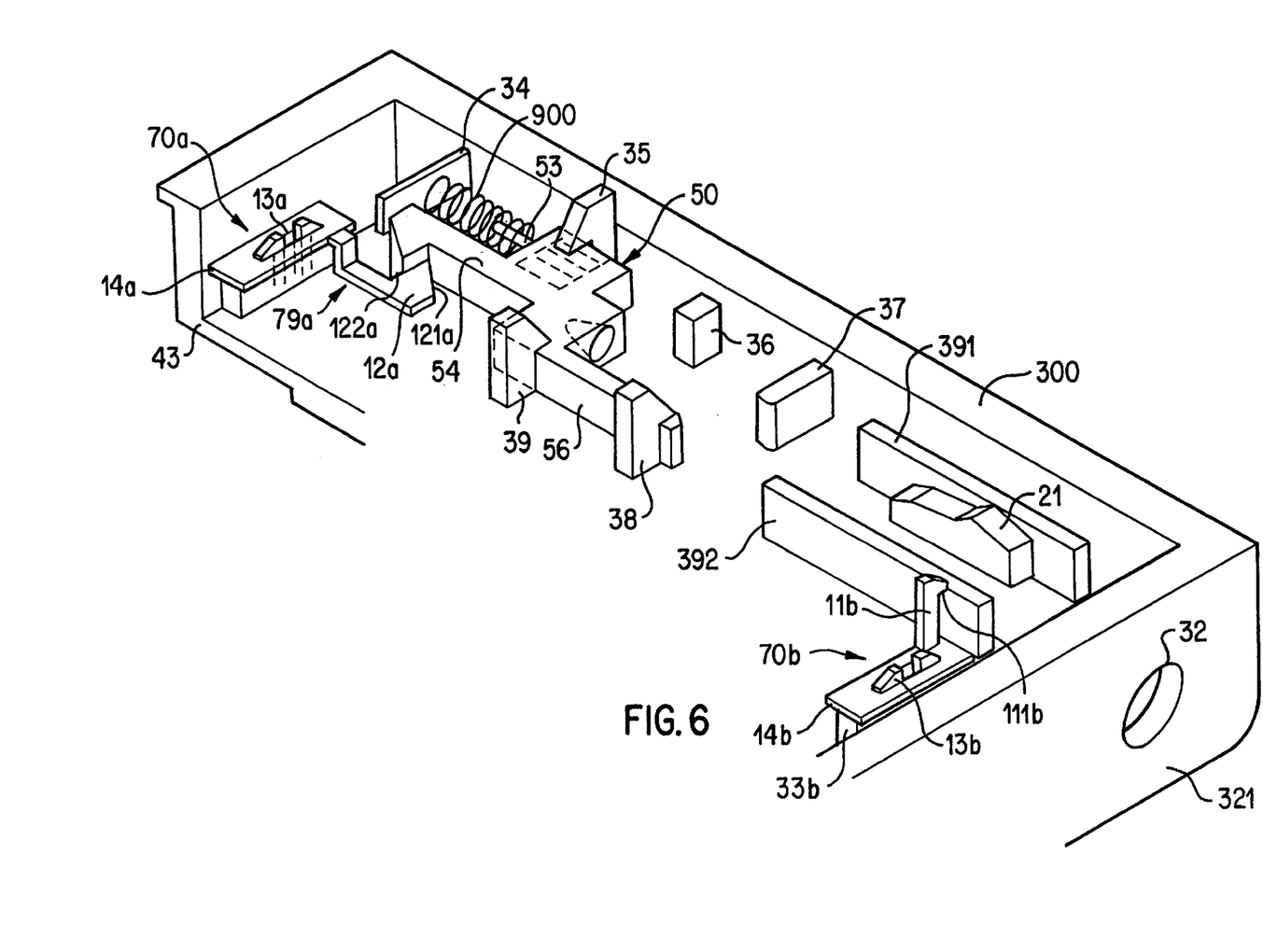
FIG. 6 is a perspective view of the stylus removal mechanism according to another embodiment of the present invention disposed in an open display housing.
Figure 7:
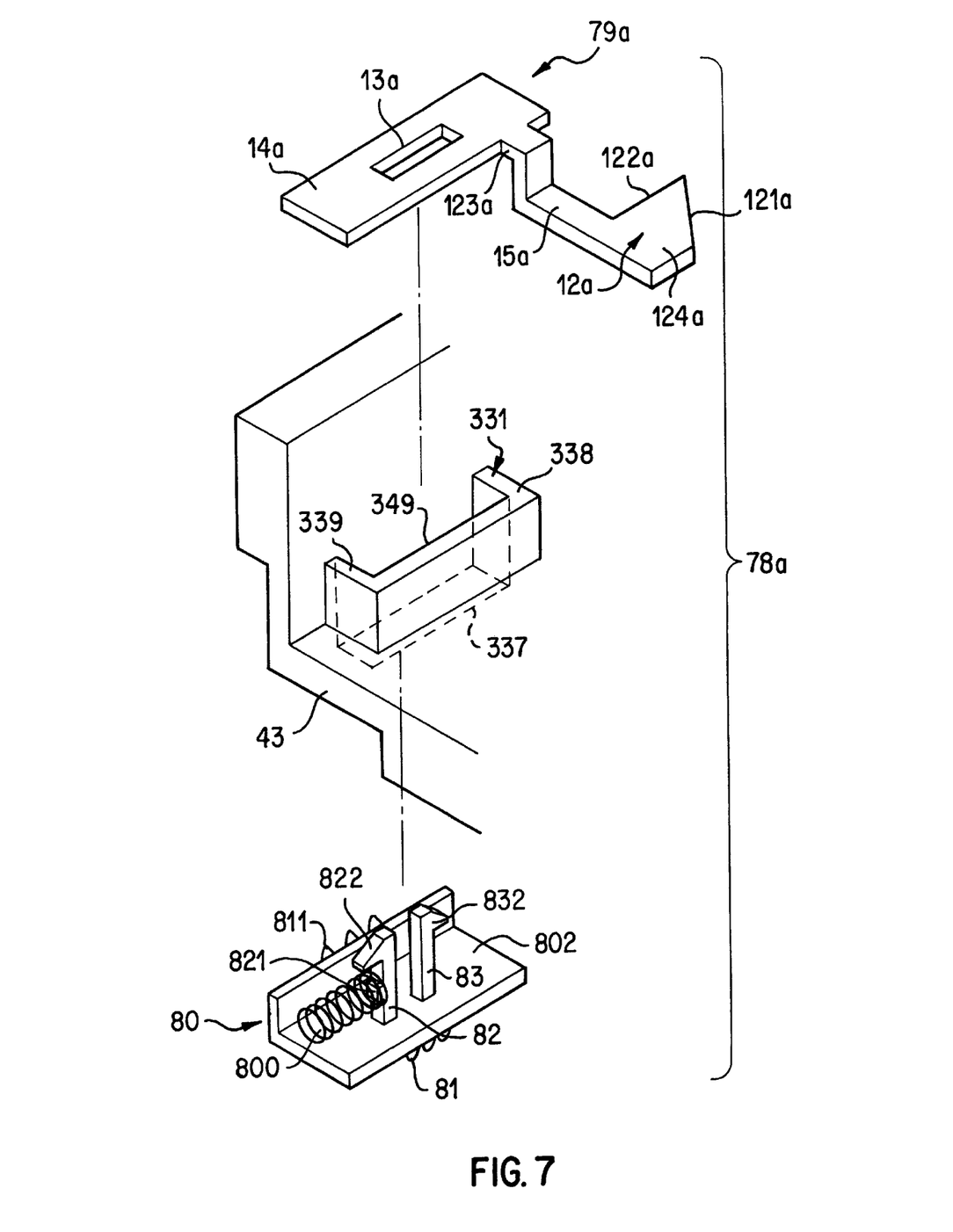
FIG. 7 is an exploded perspective view illustrating in greater detail the switch assembly of FIG. 6.

FIGS. 6 and 7 illustrate an alternative embodiment of the stylus removal mechanism in which the latch assembly 78a has been modified to only release the stylus 60, but not the display housing 30a. Since most of the elements in FIGS. 6 and 7 are identical to those in FIGS. 2–5, the same numeral designations shall be used in these two sets of FIGURES, but an "a" will be added to the designations in FIGS. 6 and 7 for those elements that have been modified.

As can be seen in FIGS. 6 and 7, the only modification is to the latch 79, since the body portion 331 and knob 80 can have the same construction as that described above. As best seen in FIG. 7, the modified latch 79a essentially omits the hook arm 11, while still retaining the leg 12a. Therefore, the operation of the leg 12a to engage and disengage the surface 55 of the block 50 is still the same as that described above. Since the latch assembly 78a does not control the locking of the display housing 30a, the latch assembly 78a alone will be sufficient for use with a portable computing device 10 that does not have a pivoting or hinged display housing 30a. However, where the portable display device 10 does include a display housing 30a, such as shown in FIG. 6, the display housing 30a can be provided with a locking mechanism 70b that functions primarily to lock the display housing 30a to the keyboard housing 40. The locking mechanism 70b is separate from the stylus removal mechanism 70a, and can be configured to be the same as shown in FIG. 4, except that the leg 12 is omitted. In other words, the locking mechanism 70b has a body portion 331 and a knob 80 that are identical those shown in FIG. 4, but the latch has a plate 14*b* that only provides the hook arm 11*b*, without any leg (such as 12). Thus, the locking mechanism 70*b* can operate in the same manner as described in FIG. 2 to lock the display housing 30*a* to the keyboard housing 40, with the hook arm 11*b* operating to engage an undersurface of a shoulder 42 of the keyboard housing 40.

Thus, the operations of the mechanisms 70*a* and 70*b* in FIGS. 6 and 7 are essentially the same as described above for the mechanism 70, except that one mechanism 70*a* is responsible solely for controlling the removal of a stylus, and the other mechanism 70*b* is solely responsible for locking and releasing the display housing 30*a*.

It will be recognized that the above described invention may be embodied in other specific forms without departing from the spirit or essential characteristics of the disclosure. For example, the stylus removal mechanism 70 (and the associated block 50 and guide tracks) can be located in the keyboard housing 40 instead of the display housing 30. Also, alternative configurations can be utilized to guide the movement of and otherwise support the block 50, to support, guide and hold the stylus 60, to bias the block 50 in a forward direction and to stop the forward and rearward movement of the block 50. Thus, it is understood that the invention is not to be limited by the foregoing illustrative details, but rather is to be defined by the appended claims.

What is claimed is:

1. A stylus removal mechanism comprising:

a stylus;

a block having a chamber for receiving a portion of the stylus;

a first biasing element coupled to the block to bias the block in a first direction;

a latch assembly that includes a plate having a hooked leg;

a second biasing element coupled to the plate to bias the plate in a second direction different from the first direction, with the hooked leg engaging the block against the bias of the first biasing element; and wherein when the plate is moved in a third direction opposite to the second direction, the hooked leg disengages the block so that the first biasing element biases the block in the first direction.

2. The apparatus of claim 1, wherein the block includes an engaging surface for removably engaging the hooked leg.

3. The apparatus of claim 1, wherein the latch assembly further includes a knob coupled to the plate for manipulation by a user.

4. The apparatus of claim 3, wherein the latch assembly further includes a body portion having opposing first and second end walls, and a first arm and a second arm that are coupled to the knob, the first and second arms extending through the body portion to couple the plate, with the second biasing element coupled to the first end wall for biasing the first arm from the first end wall, and with movement of the second arm limited by the second end wall.

5. The apparatus of claim 4, wherein the plate has an elongated opening through which the first and second arms extend.

6. A portable computing device, comprising:

a. a first housing; and b. a second housing hingedly coupled to the first housing, the second housing having an interior that stores a stylus, and which houses a stylus removal mechanism, the stylus removal mechanism having a first part that retains a portion of the stylus, and a second part that releasably engages the first housing and the first part so that manipulation of the second part simultaneously releases the first housing from the second housing and removes the stylus from the second housing.

7. The device of claim 6, wherein the stylus removal mechanism includes:

the first part having a block that has a chamber for receiving a portion of the stylus;

a first biasing element coupled to the second housing and the block to bias the block in a first direction;

the second part having a latch assembly that includes a plate having a hooked leg; and a second biasing element coupled to the plate to bias the plate in a second direction different from the first direction, with the hooked leg engaging the block against the bias of the first biasing element;

wherein when the plate is moved in a third direction opposite to the second direction, the hooked leg disengages the block so that the first biasing element biases the block in the first direction to remove the stylus.

8. The apparatus of claim 7, wherein the plate further includes a second hooked leg that engages the shoulder when the second biasing element biases the plate in the second direction, with the second hooked leg disengaging the shoulder to release the second housing from the first housing when the plate is moved in the third direction.

9. The apparatus of claim 8, wherein the second hooked leg has an angled surface that slides along the shoulder when the first and second housings are pivoted towards each other.

10. The apparatus of claim 7, wherein the block includes an engaging surface for removably engaging the hooked leg.

11. The apparatus of claim 7, wherein the latch assembly further includes a knob coupled to the plate for manipulation by a user.

12. The apparatus of claim 11, wherein the latch assembly further includes:

a body portion mounted to the second housing, the body portion having opposing first and second end walls, and with the second housing having an elongated opening at the body portion to communicate with the body portion;

a first arm and a second arm that are coupled to the knob, the first and second arms extending through the elongated opening and the body portion to couple the plate;

wherein the second biasing element is coupled to the first end wall for biasing the first arm from the first end wall, and wherein movement of the second arm is limited by the second end wall.

13. The apparatus of claim 12, wherein the first and second arms each has a hooked end, and wherein the plate has an elongated opening having opposing ends, wherein the hooked end of each of the first and second arms extends through the elongated opening of the plate and engages one of the opposing ends of the elongated opening of the plate.

14. The apparatus of claim 7, further including a plurality of guides extending from the second housing to form a track to guide the movement of the block in the first direction.

15. The apparatus of claim 14, wherein the second housing further includes a support plate, with the first biasing element coupled to the support plate and the block to bias the block away from the support plate.

16. The apparatus of claim 7, wherein the block has an angled surface, and the hooked leg of the latch assembly has an angled surface that slidably engages the angled surface of the block when the block is moved in a direction opposite to the first direction.

* * * * *